United States Patent

Morimoto et al.

[11] Patent Number: 4,647,404
[45] Date of Patent: Mar. 3, 1987

[54] PROCESS FOR PREPARING A METAMORPHOSED METAL OXIDE

[75] Inventors: Takuo Morimoto, Kyoto; Kihachiro Nishiuchi; Kenichi Wada, both of Tokushima, all of Japan

[73] Assignee: Otsuka Chemical Co., Ltd., Osaka, Japan

[21] Appl. No.: 672,792

[22] Filed: Nov. 19, 1984

[30] Foreign Application Priority Data

Nov. 21, 1983 [JP] Japan ............... 58-220350

[51] Int. Cl.$^4$ .......... H01B 1/04; C01G 1/02
[52] U.S. Cl. .......... 252/516; 252/518; 252/519; 252/520; 252/521; 423/263; 423/592; 423/593; 423/608; 423/610; 423/617; 423/618
[58] Field of Search .......... 423/598, 592, 617; 252/516, 520

[56] References Cited

U.S. PATENT DOCUMENTS

| | | | |
|---|---|---|---|
| 1,173,005 | 2/1916 | Krueger | 252/516 |
| 1,287,849 | 12/1918 | Booth | 252/516 |
| 1,658,334 | 2/1928 | Holmgren | 252/516 |
| 2,206,792 | 7/1940 | Stalhane | 252/516 |
| 2,714,096 | 7/1955 | Suchet | 252/516 |
| 2,806,005 | 9/1957 | White | 252/516 |
| 3,040,282 | 6/1962 | Heath | 252/516 |
| 3,162,831 | 12/1964 | Heath | 252/516 |
| 3,968,057 | 7/1976 | Dulin | 252/516 |
| 4,137,519 | 1/1979 | Hodge | 252/516 |

Primary Examiner—H. T. Carter
Attorney, Agent, or Firm—Stiefel, Gross, Kurland & Pavane

[57] ABSTRACT

A process for preparing a metamorphosed metal oxide, which comprises heating, under a non-oxidative (and not hydrogenous) atmosphere, a mixture of at least one metal oxide, said metal being selected from the group consisting of elements of Groups III, IV, V and II b and transition elements in Periodic Table, and a carbide represented by the formula:

$$C(M)_z$$

wherein M is an element except carbon selected from the group consisting of elements of Groups III, IV and V in Periodic Table, and Z is an integer corresponding to the valency of M, is disclosed. The process is simple and safe and the metamorphosed metal oxide obtained is modified in color tint and provided with electroconductivity.

13 Claims, No Drawings

PROCESS FOR PREPARING A METAMORPHOSED METAL OXIDE

BACKGROUND OF THE INVENTION

1. Field of the Invention

The invention relates to a process for preparing a metamorphosed metal oxide.

2. Description of the Prior Art

Recently, development of metal suboxides has become a subject drawing attention, in accordance with diversified industrial needs. For instance, there has been developed a method of preparing a blacked titanium oxide by metamorphosing and reducing titanium dioxide under a hydrogenous atmosphere. This method, however, was in danger of explosion because the reaction was performed at a high temperature under a hydrogenous atmosphere. Thus, in order to secure safety, it has been required on carrying out the method to solve some troublesome problems in manufacturing equipments and process controls.

Moreover, the hydrogenated type titanium oxides thus obtained, which might lose electroconductivity owing to the split off of hydrogen atoms by a possible contact with an oxidative atmosphere, were limited in their use.

Under the circumstances, it has been desired to develop a novel process for preparing electroconductive metal oxides which are heat-resistant, colored and free from the above defects.

SUMMARY OF THE INVENTION

The present invention relates to a process for preparing a metamorphosed metal oxide, which comprises heating, under a non-oxidative atmosphere, a mixture of at least one metal oxide, said metal being selected from the group consisting of elements of Groups III, IV, V and II b and transition elements in Periodic Table, and a carbide represented by the formula:

$$C(M)_z \qquad (I)$$

wherein M is an element except carbon selected from the group consisting of elements of Group III, IV and V in Periodic Table, and z is an integer corresponding to the valency of M.

The process of the present invention has the following advantages:

(1) Modification of color tint and/or metamorphosis providing electroconductivity of the metal oxides used as the raw materials can be performed effectively, without losing their heat resistance and other properties.

(2) Treatment for the metamorphosis is safe and simple, because heating under hydrogenous atmosphere is not necessary.

(3) Any step for isolating the carbide used as the raw material from the resulting metamorphosed metal oxide is not necessary, and the latter can be used as it is as a conductive sintered body because those substances derived from said raw material are excellent in heat resistance and maintain good conductivity.

DESCRIPTION OF THE PREFERRED EMBODIMENT

According to the present invention, at least one metal oxide is used, the metal of which is selected from the group consisting of elements of Groups III, IV, V and II b and transition elements in Periodic Table. Examples of such metal oxides include, titanium oxide, tin oxide, antimony oxide, cesium oxide, potassium oxide, yttrium oxide, indium oxide, silicon oxide, germanium oxide, lead oxide, bismuth oxide, niobium oxide, zinc oxide, iron oxide, nickel oxide, cobalt oxide, etc. Preferred ones among them are titanium oxide, tin oxide, antimony oxide, etc. These metal oxides may be employed either individually or as a mixture of two or more of them.

As the carbides of the general formula (I) may be employed any one known in the art. Examples of the carbides are boron carbide, silicon carbide, titanium carbide, germanium carbide, tin carbide, lead carbide, phosphorus carbide, etc. and among them boron carbide, silicon carbide and titanium carbide are preferred. These carbides may be employed either individually or as a mixture of two or more of them.

Although the mechanism of the metamorphosis of metal oxides in accordance with the process of the present invention is not thoroughly clarified, it is assumed that, when a mixture of the metal oxide and the carbide of the formula (I) is heated under a non-oxidative atmosphere, the carbide may act as a deoxidant and cause reductive metamorphosis of the metal oxide and yields a product possessing good conductivity and changed color, whereby the carbide also may be dehydrogenized or oxidized and the conductivity of the metamorphosed metal oxide is not reduced.

As for the ratio of mixing the metal oxide and the carbide of the formula (I), the two components may be mixed in such ratio that the number of carbon atoms in the carbide is 0.01 to 10 times, preferably 0.1 to 3 times, per one oxygen atom in the metal oxide except the oxygen atom(s) constituting any water of crystallization contained therein, although the ratio may vary depending on the sort of the metal oxide and the carbide employed and also on the purpose of utilizing the product obtained. When the amount of the carbide admixed is too small, difficulties are liable to occur in attaining the purpose of the present invention. On the other hand, when the amount of the carbide admixed is too much, operation for mixing the raw materials becomes troublesome one and a lot of energy is required for the heating.

If it is necessary to separate an excessive carbide remaining after the metamorphosis of the metal oxide, the separation may be effected utilizing the difference in specific gravity between the metal oxide and the carbide. However, the remaining carbide in the metamorphosed product usually does not restrict the use of the product. Non-oxidative atmosphere in the present invention means a non-oxidative atmosphere containing substantially more than 90% by volume of one or more of reducing gases such as carbon monoxide, or inert gases such as nitrogen, helium or carbon dioxide. Especially, nitrogen gas atmosphere or carbon dioxide gas atmosphere is preferable.

The heat treatment according to the present invention is performed usually at 500° to 1500° C. for 2 to 600 mins., preferably at 800° to 1200° C. for 5 to 180 mins., though the conditions for the treatment may vary depending on the sort of the raw materials and the usage of the resultant. No special furnace is required for the heat treatment, and any usual furnace for heating can be used.

Although the heat treatment may be performed by heating a simple mixture of the metal oxide and the carbide as it is, it is preferred to use a uniform mixture of the metal oxide and the carbide both in fine powdery form so that the metal oxide may well contact with the carbide. Further, it is desirable to remove air contained in the mixture, especially, the mixture of powdery metal oxide and powdery carbide, or replace the air with a non-oxidative material, as far as possible. The air contained in the mixture would cause consumption of the carbide before completion of the metamorphosis of the metal oxide, require a prolonged time for the metamorphosis and an excess amount of the carbide, and be liable to incomplete or non-uniform metamorphosis.

Therefore, it is preferable in the present invention to remove air from the mixture of the metal oxide and the carbide, for example, by (1) a method comprising first compressing the mixture under reduced pressure into a compact and then heating the compact, or
(2) a method comprising admixing with the mixture a binder which is decomposed into non-oxidative gases upon heating, compressing the admixture into a compact, if necessary, and then heating the admixture or the compact.

The binder which is decomposed into non-oxidative gases upon heating means those compounds which contain as the main component one or more elements selected from hydrogen, carbon and nitrogen and are decomposed upon heating into water vapor, carbon dioxide gas, carbon monoxide gas or nitrogen gas. The binder may be one arbitrarily selected from water, ammonia, amino compounds, nitrogen-containing compounds, hydrocarbons, carbohydrates and various synthetic resins, or a mixture of them, provided that it is in liquid form at ambient temperature or at the time of molding under pressure and can exert a binding ability necessary for the molding of the mixture of the metal oxide and the carbide. However, from the viewpoint of economy and of the applications of the product, those are exemplified such as water, hydrocarbon compounds, glycerol, ethylene glycol, carbohydrate compounds such as starch, urea derivatives, polyvinyl alcohol, butyral resin, polyvinyl acetate resin, atactic polyethylene, liquid polypropylene, polybutene, acrylic resin, etc.. The amount of these binders to be used may vary without limitation depending on the sorts of the metal oxide and the carbide as well as the purpose of the applications. However, it is preferred to use the binder in an amount not more than 300 parts by weight (hereinafter, parts by weight are referred to as "parts"), more preferably not more than 100 parts, per 100 parts of the total amount of the metal oxide and the carbide. Too large amount of binder is undersirable because it requires excessive heating during the metamorphosis and removal of decomposition products resulting from the remaining binder.

By heating under a non-oxidative atmosphere, the above-mentioned binder produces carbides remaining as ash, most of which however are harmless to electro-conductive metamorphosis, though they are colored black. Therefore, it is unnecessary to specially separate and remove the decomposition products of the binder before practical use of the product, so far as the binder is used in an appropriate amount.

According to the present invention, it is also possible to use a sintering binder in combination, which sinters and acts as a binder of the mixture of metal oxide and carbide on heating.

Further, it is possible according to the present invention to obtain a metamorphosed molding or compact having conductivity, by molding a mixture of metal oxide, carbide, sintering binder and, if required, a binder necessary for molding and then heating the molded article under a non-oxidative atmosphere whereby metamorphosis of the metal oxide and the metamorphosis and molding by the sintering binder are effected simultaneously.

For the molding of the mixture of metal oxide, carbide and binder, any conventional molding method wherein a uniform mixture prepared by a conventional method and heated at room temperature or at such temperature that does not cause vaporization or decomposition of the binder is subjected to any one of the following molding processes:

(1) a process using a compression molding machine, wherein the mixture is filled into a mold and then compressed,
(2) a process using a granulating molding machine, wherein the mixture is put into a granulator to obtain granules or flakes,
(3) a process using a tablet machine, wherein the mixture is tabletted, and
(4) a process using a press rolls, wherein the mixture is passed through the rolls to give a sheet. However, it is preferred from the viewpoint of uniformity and efficiency of the heating during the metamorphosis, to effect the molding in such way that the molding obtained has a larger surface area. In general, the thicker the molding, the larger the temperature gradient therein. It is necessary to control the thickness of moldings in order to avoid unevenness of the heating i.e. unevenness of the metamorphosis.

The invention is further illustrated by the following Examples. These Examples, however, are given only for illustration of the present invention and never for restriction of the invention.

EXAMPLE 1

2.5 g of anatase type titanium dioxide and 1 g of powdered silicon carbide were thoroughly mixed in a mortar. The mixture was charged in a boat-shaped 30 ml crucible made of highly pure alumina. Air in the crucible was displaced with nitrogen gas. The crucible was put in a tubular electric furnace made of highly pure alumina (inner diameter of the tube: 50 mm, length: 1 m) maintained at 1100° C., heat-treated for 2 hours under nitrogen stream of 50 ml/min., cooled to room temperature also under nitrogen stream and then took out. Titanium oxide changed to pale blue color was obtained. For comparison, titanium dioxide without addition of powdered silicon carbide was heated and modified under the same condition as above. The resultant titanium oxide was white with no change in color.

EXAMPLE 2

A mixture of anatase type titanium dioxide and powdered silicon carbide prepared by the same method as in Example 1 was pressed in a tableting machine at a pressure of 150 kg/cm$^2$ for 30 mins. in vacuo, to get tablets of 10 mm diameter and 1 mm thickness which consist of anatase type titanium dioxide and silicon carbide.

The tablets was put in a platinum boat followed by putting into an electric furnace same as in Example 1 where nitrogen gas was flowed in for 30 mins. Then tablets were heated and modified at temperatures and periods shown in Table 1 under nitrogen stream.

The properties of the resultant tablets of mixtures of metamorphosed titanium oxide and silicon carbide are shown in Table 1.

For comparison, the result obtained from an experiment made with titanium dioxide without silicon carbide is shown as Comparative Example 1 in Table 1.

TABLE 1

| Example No. | Condition of metamorphosis temperature (°C.) | time (min) | Color before | Color after | Conductivity before | Conductivity after |
|---|---|---|---|---|---|---|
| 2 | 900 | 30 | grayish white | pale blue | no | yes |
| 3 | 1000 | 20 | grayish white | bluish violet | no | yes |
| 4 | 1050 | 30 | grayish white | bluish violet | no | yes |
| 5 | 1100 | 15 | grayish white | blackish violet | no | yes |
| 6 | 1150 | 10 | grayish white | blackish violet | no | yes |
| Comparative Example 1 | 1050 | 30 | grayish white | grayish white | no | no |

Note (1)

In Table 1, the conductivity was evaluated by the use of Digital Multimeter TR 6841 (made by Takeda Riken Co., Ltd., Japan).

The term "no" means the case in which the value of resistance was not less than $10^6 \Omega$ when the electrodes were contacted to both sides of the tablet. The term "yes" means the case in which the value of resistance was not more than $10^3 \Omega$ by the same measurement as above.

EXAMPLE 7

2.5 g anatase type titanium dioxide, 1 g of silicon carbide and 0.5 g of liquid paraffin as a binder were thoroughly mixed in a mortar.

The mixture was filled in mold, pressed at a pressure of 20 kg/cm² for 3 mins., to get a cylindrical molded article of 10 mm diameter and 40 mm length. The resultant article in a platinum boat was put into an electric furnace.

After aerating for 30 mins. and replacing with nitrogen, the article was heated at 1150° C. for 30 mins. under nitrogen stream of 50 ml/min. to get a cylindrical product of blackish violet color with some voids. The loss in weight was 15%.

The surface of this cylindrical product was coated with silver paste, and the conductivity was measured by the same method as in Example 2 to be $5.9 \times 10^4 \Omega$. The volume resistivity was $1.16 \times 10^4 \Omega$cm; by calculating the following equation.

Volume resistivity =

$$\frac{\text{measured resistance } (\Omega) \times \text{area of electrode (cm}^2)}{\text{distance between electrodes (cm)}}$$

For comparison, the same experiment as in Example 7 was carried out except that silicon carbide was not used. The product showed grayish white with no change from the initial material. In addition, when the mixture without addition of the binder was pressed at 20 kg/cm² for 3 mins., it did not give a cylindrical and hard molded article.

EXAMPLE 8 TO 19

Molding was repeated by the same method as in Example 7 except that the sorts of metal oxides, the amounts of the silicon carbide compounds, the sorts and the amount of binders, temperatures and periods of heating, were varied as shown in Tables 2 and 3. The results of metamorphosis are shown in Table 3.

TABLE 2

| Example No. | Metal oxide Sort | Amount (g) | Carbide Sort | Amount (g) | Binder Sort | Amount (g) |
|---|---|---|---|---|---|---|
| 8 | titanium dioxide (anatase) | 2.5 | silicon carbide | 1 | liquid paraffin | 1.0 |
| 9 | titanium dioxide (anatase) | 4 | titanium carbide | 1.5 | ethylene glycol | 1.0 |
| 10 | titanium dioxide (rutile) | 2.5 | silicon carbide | 1 | liquid paraffin | 1.0 |
| 11 | titanium dioxide (rutile) | 4 | silicon carbide | 1 | 10% aqueous solution of starch | 0.8 |
| 12 | tin oxide (Sn$_2$O$_3$) | 4 | silicon carbide | 1 | liquid paraffin | 1.0 |
| 13 | tin oxide (Sn$_2$O$_3$) | 4 | silicon carbide | 1 | liquid paraffin | 1.0 |
| 14 | tin oxide (Sn$_2$O$_3$) | 4 | silicon carbide | 1 | polybutene | 0.5 |
| 15 | tin oxide (Sn$_2$O$_3$) | 4 | silicon carbide | 1 | 7% aqueous solution of CMC | 0.7 |
| 16 | tin oxide (Sn$_2$O$_3$) antimony oxide | 3 1 | silicon carbide | 1 | liquid paraffin | 0.8 |
| 17 | anatase titanium oxide tin oxide (Sn$_2$O$_3$) | 3 1 | titanium carbide | 1.5 | liquid paraffin | 1.0 |
| 18 | hydrated titanium oxide | 5 | silicon carbide | 1 | liquid paraffin | 1.0 |
| 19 | anatase titanium oxide antimony oxide | 3 1 | silicon carbide | 1 | liquid paraffin | 1.0 |

TABLE 3

| Example No. | Condition of metamorphosis temperature (°C.) | time (min) | Color before | Color after | Conductivity of Product ($\Omega$) |
|---|---|---|---|---|---|
| 8 | 700 | 120 | grayish white | pale violet | $2.9 \times 10^7$ |
| 9 | 1200 | 60 | dark violet | blackish violet | $8.5 \times 10^3$ |
| 10 | 1150 | 60 | dark violet | bluish violet | $4.1 \times 10^4$ |
| 11 | 1200 | 60 | dark | deep | $9.2 \times 10^4$ |

TABLE 3-continued

| Example No. | Condition of metamorphosis | | Color | | Conductivity of Product ($\Omega$) |
| --- | --- | --- | --- | --- | --- |
| | temperature (°C.) | time (min) | before | after | |
| 12 | 800 | 30 | violet dark violet | violet gray | $2.1 \times 10^4$ |
| 13 | 900 | 30 | dark violet | gray | $1.8 \times 10^4$ |
| 14 | 950 | 15 | dark violet | gray | $9.3 \times 10^3$ |
| 15 | 880 | 60 | dark violet | gray | $1.3 \times 10^4$ |
| 16 | 900 | 30 | dark violet | gray | $4.2 \times 10^3$ |
| 17 | 1100 | 60 | dark violet | bluish violet | $2.9 \times 10^4$ |
| 18 | 1150 | 60 | dark violet | bluish violet | $1.7 \times 10^4$ |
| 19 | 1050 | 60 | dark violet | bluish violet | $8.3 \times 10^3$ |

What is claimed is:

1. A method of preparing an electroconductive, heat resistant metal oxide which corprises heating at 500° C. to 1500° C. for a period of from 2 to 600 minutes, under a non-oxidative atmosphere, a mixture of at least one metal oxide selected from the group consisting of titanium dioxide and antimony oxide, with silicon carbide or titanium carbide, the number of carbon atoms in the carbide being from 0.01 to 10 times the number of oxygen atoms in the metal oxide exclusive of oxygen atoms included in any water of crystallization contained in said oxide.

2. A method according to claim 1 wherein the number of carbon atoms in the carbide is 0.1 to 3 times the number of oxygen atoms in the metal oxide exclusive of oxygen atoms included in any water of crystallization contained in said oxide.

3. A method according to claim 1 wherein the non-oxidative atmosphere comprises more than 90% by volume of at least one gas selected from the group consisting of reducing gases and inert gases.

4. A method according to claim 3 wherein said reducing gas is carbon monoxide.

5. A method according to claim 3 wherein said inert gases are nitrogen, helium and carbon dioxide.

6. A method according to claim 1 wherein the heating is effected at 800° to 1200° C. for a period of from 5 to 180 minutes.

7. A method according to claim 1 wherein the mixture is compressed under reduced pressure prior to heating to remove air therefrom.

8. A method according to claims 1 or 7 wherein the mixture is admixed with a binder which decomposes into at least one non-oxidative gas upon heating.

9. A method according to claim 8 wherein said non-oxidative gas is water vapor, carbon dioxide, carbon monoxide or nitrogen.

10. A method according to claim 8 wherein the binder comprises at least one material selected from the group consisting of water, ammonia, amino compounds, nitrogen compounds, hydrocarbons, carbohydrates and synthetic resins.

11. A method according to claim 10 wherein the binder comprises one or more materials selected from the group consisting of liquid paraffin, ethylene glycol, aqueous starch and polybutene.

12. A method according to claim 1 wherein both said metal oxide and said carbide are in fine powdery form.

13. A method according to claim 1 wherein said metal oxide is titanium dioxide.

* * * * *